US012683526B2

(12) United States Patent
Sovenyi et al.

(10) Patent No.: US 12,683,526 B2
(45) Date of Patent: *Jul. 14, 2026

(54) TECHNIQUES FOR REDUCTION OF ELECTRIC MOTOR TORQUE PULSATION

(71) Applicant: FCA US LLC, Auburn Hills, MI (US)

(72) Inventors: Szabolcs Sovenyi, Bloomfield Hills, MI (US); Jeffrey Orzechowski, Troy, MI (US); Fabrice Charlette, Vaux sur Seine (FR)

(73) Assignee: FCA US LLC, Auburn Hills, MI (US)

( * ) Notice: Subject to any disclaimer, the term of this patent is extended or adjusted under 35 U.S.C. 154(b) by 209 days.

This patent is subject to a terminal disclaimer.

(21) Appl. No.: 18/489,088

(22) Filed: Oct. 18, 2023

(65) Prior Publication Data

US 2025/0132702 A1      Apr. 24, 2025

(51) Int. Cl.
    *H02P 6/10*          (2006.01)
    *H02K 29/03*         (2006.01)
(52) U.S. Cl.
    CPC .............. H02P 6/10 (2013.01); H02K 29/03 (2013.01); *H02K 2201/06* (2013.01)
(58) Field of Classification Search
    CPC ...... H02P 6/10; H02K 29/03; H02K 2201/06; H02K 21/14
    See application file for complete search history.

(56) References Cited

U.S. PATENT DOCUMENTS

| | | | |
|---|---|---|---|
| 5,780,986 A | 7/1998 | Shelton et al. | |
| 7,005,822 B1 | 2/2006 | O'Gorman et al. | |
| 7,034,424 B2 | 4/2006 | Kometani et al. | |
| 9,006,951 B2 | 4/2015 | Janecek et al. | |
| 9,106,178 B2 | 8/2015 | Han et al. | |
| 9,136,785 B2 | 9/2015 | Gebregergis et al. | |
| 9,343,937 B2 | 5/2016 | Nakazono et al. | |
| 10,916,981 B2 | 2/2021 | Roh | |
| 2012/0007465 A1 | 1/2012 | Fargo et al. | |
| 2019/0135118 A1* | 5/2019 | Moon ..................... | B60L 53/20 |
| 2025/0132653 A1* | 4/2025 | Sovenyi ................ | H02K 29/03 |

OTHER PUBLICATIONS

Osorno, Bruno, et al., "Vector Control of Induction Motor", International Journal For Technological Research In Engineering, vol. 5, Issue 9,, p. 3909-3913, May 2018.

Zhang, Nian, et al., A harmonic injection method for improving NVH performance of permanent magnet synchronous motor:, Journal of Physics: Conf. Ser. 1802 032132 (2021).

* cited by examiner

*Primary Examiner* — Thomas Truong
(74) *Attorney, Agent, or Firm* — Jeremy J. Klobucar

(57) ABSTRACT

An electric motor system, such as for an electrified vehicle, includes a permanent magnet motor (PMM) including a hollow cylindrical stator defining a circular inner portion with a plurality of slots, defined between a respective plurality of ferromagnetic teeth, and having a plurality of electromagnetic coils arranged in the plurality of slots, respectively, and a cylindrical rotor disposed within the stator and defining a circular outer portion having N pairs of permanent magnets arranged thereabout to define N rotor poles, respectively, wherein N is an even integer greater than or equal to four, and a controller configured to control the PMM to mitigate or eliminate magnetic cogging by controlling each pair of electromagnetic coils to stagger or offset a stator magnetic field generated by the pair of electromagnetic coils relative to the rotor magnetic poles.

18 Claims, 10 Drawing Sheets

TECHNIQUES FOR REDUCTION OF ELECTRIC MOTOR TORQUE PULSATION

FIELD

The present application generally relates to electrified vehicles and, more particularly, to techniques for reduction of electric motor torque pulsation.

BACKGROUND

Electrified vehicles include at least one electric motor that includes a stator and a rotor coupled to a shaft and configured to magnetically spin to generate drive torque, such as for vehicle propulsion. One type of electric motor often utilized for electrified vehicle traction motors is a permanent magnet motor (PMM), such as a synchronous PMM. At some shaft speed ranges and under some torque levels, PMMs produce a pulsing, vibrating torque. The passengers of the electrified vehicle could potentially feel this vibration (e.g., in the seats and other parts of the vehicle) and some passengers may find it disturbing. In response to the pulsing motor current, the motor coils and even some of the capacitors in the control module may also emit audible sound. The passengers could potentially hear the audible sound and, similar to the vibration, some passengers may find it disturbing.

In addition, the vibration of structural and powertrain components is also known to accelerate the wear of sliding and rolling surfaces, and adversely impact reliability and durability. The pulsing torque typically manifests under some combinations of high torque and low shaft speed levels. There may be several shaft speed ranges in which a particular vehicle powertrain may produce resonances and vibrations. Conventional solutions to this problem include skew configurations (coils or linearly-skewed magnets), harmonic current injection, and current modification. These solutions, however, do not fully solve the vibration/noise problem and/or drastically reduce motor efficiency. Accordingly, while such conventional vehicle electric motors do work for their intended purpose, there exists an opportunity for improvement in the relevant art.

SUMMARY

According to one example aspect of the invention, an electric motor system for an electrified vehicle is presented. In one exemplary implementation, the electric motor system comprises a permanent magnet motor (PMM) including hollow cylindrical stator defining a circular inner portion with a plurality of slots, defined between a respective plurality of ferromagnetic teeth, and having a plurality of electromagnetic coils arranged in the plurality of slots, respectively, and a cylindrical rotor disposed within the stator and defining a circular outer portion having N pairs of permanent magnets arranged thereabout to define N rotor poles, respectively, wherein N is an even integer greater than or equal to four, and a controller configured to control the PMM to mitigate or eliminate magnetic cogging by controlling each pair of electromagnetic coils to stagger or offset a stator magnetic field generated by the pair of electromagnetic coils relative to the rotor magnetic poles, wherein the controller utilizes N/2 times as many switching transistors to individually control each electromagnetic coil of each pair of electromagnetic coils to receive a different current magnitude.

In some implementations, the magnetic cogging is caused by a periodic strength of a magnetic field resulting from a periodic layout of the electromagnetic coils and the ferromagnetic stator teeth, and wherein the controller is configured to control the PMM to mitigate or eliminate the magnetic cogging when the electromagnetic coils are energized. In some implementations, the magnetic cogging is caused by the rotor poles passing under the ferromagnetic stator teeth and is mitigated or eliminated due to the staggering or offsetting of the stator magnetic field relative to the rotor magnetic poles.

In some implementations, at least some of the N pairs of permanent magnets of the rotor are arranged to have a symmetric N pole positioning, and wherein the symmetric N pole positioning is every 360/N degrees. In some implementations, at least one pair of the N pairs of permanent magnets is asymmetrically staggered or offset relative to the symmetric N pole positioning In some implementations, the magnetic cogging is caused by the rotor poles passing under the ferromagnetic stator teeth and is mitigated or eliminated due to the asymmetric staggering or offsetting of the at least one pair of the N pairs of permanent magnets.

In some implementations, at least two pairs of the N pairs of permanent magnets are asymmetrically staggered or offset relative to the symmetric N pole positioning. In some implementations, the at least two asymmetrically staggered or offset pairs of the N pairs of permanent magnets include circularly opposed pairs. In some implementations, the circularly opposed pairs are asymmetrically staggered or offset by a same amount relative to the symmetric N pole positioning. In some implementations, the at least two asymmetrically staggered or offset pairs of the N pairs of permanent magnets are asymmetrically staggered or offset by different amounts relative to the symmetric N pole positioning.

According to another aspect of the invention, a method of arranging and operating an electric motor system for an electrified vehicle, the electric motor system including a PMM and a controller, is presented. In one exemplary implementation, the method comprises providing the PMM including forming a hollow cylindrical stator defining a circular inner portion with a plurality of slots, defined between a respective plurality of ferromagnetic teeth, and having a plurality of electromagnetic coils arranged in the plurality of slots, respectively, and forming a cylindrical rotor disposed within the stator and defining a circular outer portion having N pairs of permanent magnets arranged thereabout to define N rotor poles, respectively, wherein N is an even integer greater than or equal to four, and providing a controller configured to control the PMM to mitigate or eliminate magnetic cogging by controlling each pair of electromagnetic coils to stagger or offset a stator magnetic field generated by the pair of electromagnetic coils relative to the rotor magnetic poles, wherein the controller utilizes N/2 times as many switching transistors to individually control each electromagnetic coil of each pair of electromagnetic coils to receive a different current magnitude.

In some implementations, the magnetic cogging is caused by a periodic strength of a magnetic field resulting from a periodic layout of the electromagnetic coils and the ferromagnetic stator teeth, and wherein the controller is configured to control the PMM to mitigate or eliminate the magnetic cogging when the electromagnetic coils are energized. In some implementations, the magnetic cogging is caused by the rotor poles passing under the ferromagnetic stator teeth and is mitigated or eliminated due to the staggering or offsetting of the stator magnetic field relative to the rotor magnetic poles.

In some implementations, at least some of the N pairs of permanent magnets of the rotor are arranged to have a symmetric N pole positioning, and wherein the symmetric N pole positioning is every 360/N degrees In some implementations, at least one pair of the N pairs of permanent magnets is asymmetrically staggered or offset relative to the symmetric N pole positioning In some implementations, the magnetic cogging is caused by the rotor poles passing under the ferromagnetic stator teeth and is mitigated or eliminated due to the asymmetric staggering or offsetting of the at least one pair of the N pairs of permanent magnets.

In some implementations, at least two pairs of the N pairs of permanent magnets are asymmetrically staggered or offset relative to the symmetric N pole positioning. In some implementations, the at least two asymmetrically staggered or offset pairs of the N pairs of permanent magnets include circularly opposed pairs. In some implementations, the circularly opposed pairs are asymmetrically staggered or offset by a same amount relative to the symmetric N pole positioning. In some implementations, the at least two asymmetrically staggered or offset pairs of the N pairs of permanent magnets are asymmetrically staggered or offset by different amounts relative to the symmetric N pole positioning.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

Figures 1A, 1B:
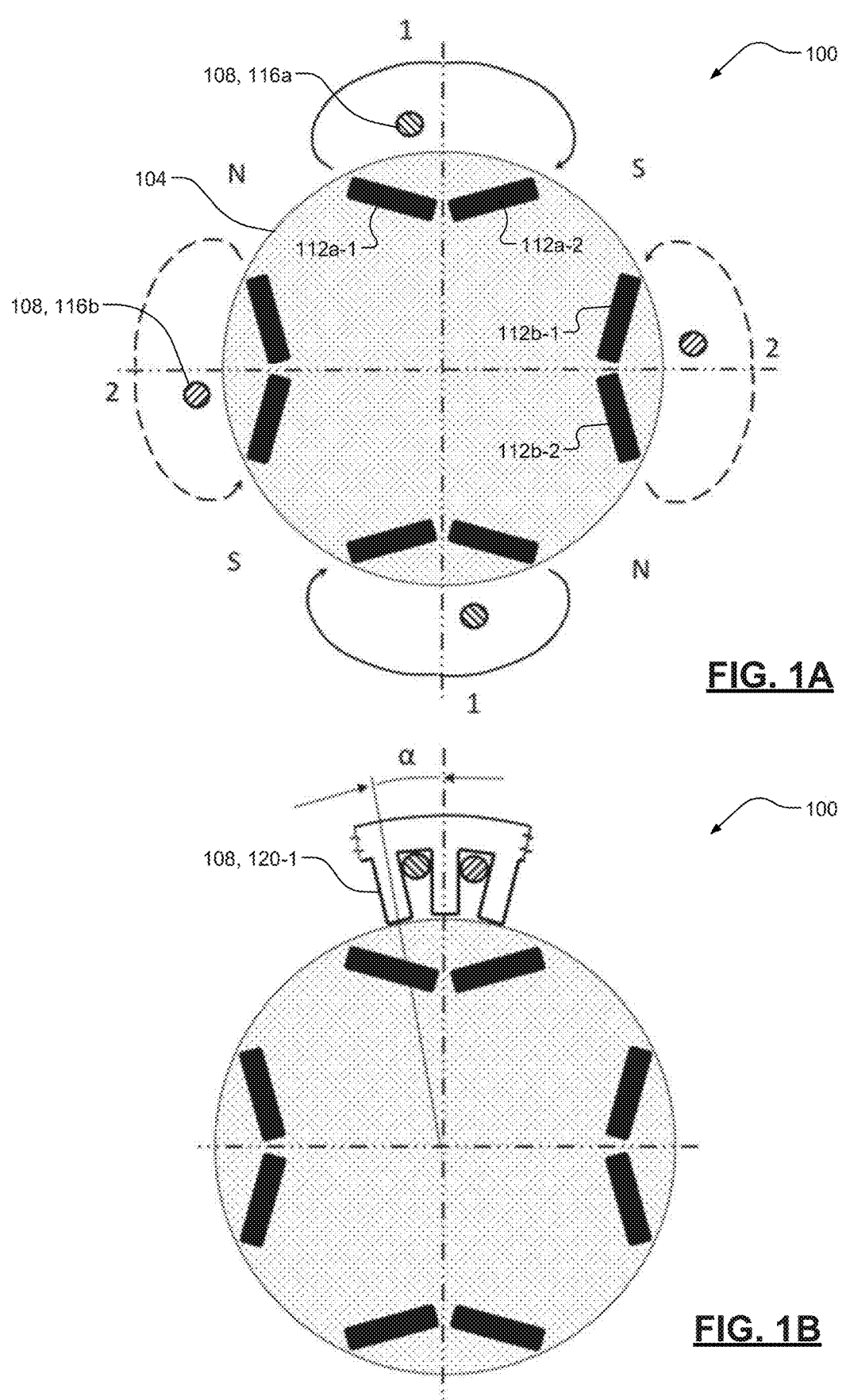
FIGS. 1A and 1B are cross-sectional diagrams of an example four-pole permanent magnet motor (PMM) having an example rotor with symmetrically arranged permanent magnet pairs and a portion of an example stator illustrating winding pitch angle, respectively, according to the principles of the present application.

As previously discussed, at some electric motor shaft speed ranges and under some torque levels, the traction motors of hybrid electric and electrified vehicles (EVs) produce a pulsing, vibrating torque (noise, vibration, and/or harshness, or NVH). In addition to potentially being felt and/or heard by vehicle passengers, the vibration of structural and powertrain components is also known to accelerate the wear of sliding and rolling surfaces, and adversely impact reliability and durability. Conventional solutions to this problem include skew configurations (coils or piecewise linearly-skewed rotor magnets), harmonic current injection, and current modification. These solutions, however, do not fully solve the vibration/noise problem and/or drastically reduce motor efficiency. For small, low-power direct current (DC) motors, skewed (e.g., twisted, spiral-like) rotor windings are used to reduce magnetic cogging. Several companies manufacture such small, high-precision DC servo motors.

This conventional solution introduces some efficiency loss, but in low-power applications this can be acceptable. Some machines employ skew of the stator slots or/and skew of the rotor magnets (e.g., a stepwise, skewed rotor). The stepwise skewed rotor likely causes efficiency loss compared to a rotor with single, straight magnets. Such solutions involving the use of skew of stator slots or/and the use of skew of rotor magnets are clearly different from the solution described in this application since they mainly focus on the skew of the complete stator or/and on the skew of the complete rotor. All these solutions have the drawbacks of an increase in manufacturing costs, imply a diminution of the maximum torque level achievable by the electric machine, and reduce efficiency. In case of "squirrel cage" asynchronous three-phase motors, skewed squirrel cage bars are used to deliver smoother torque. The skewed design introduces a permanent phase shift along the bars, and this reduces efficiency.

Another conventional solution to reduce NVH and torque ripple relies on harmonic current injection. All solutions related to harmonic current injection are clearly different from the proposed solution in this application since they only rely on the control of the currents. One of the drawbacks of such a kind of solution is the introduction of complexity in the inverter control command. Another conventional solution is to aim to reduce magnetic cogging of motors. For example, a permanent magnet rotating device with a specific combination of the number of poles and the number of slots and a spacing distance between permanent magnets inserted into the rotor. This solution is clearly different from the proposed solution in this application since the spacing distance between the permanent magnets is not related to the pitch angle and is applied on all magnets.

Another potential solution is the use of a waveform flux conducting crown around the rotor generating a counteracting cogging torque. This solution is clearly different from the proposed solution in this application since it is mainly based on a waveform flux conduction crown. First, the rotor magnets are placed asymmetrically under the poles. Second, small slots are stamped into the outer, cylindrical surface of the rotor. Third, the stator mechanical vibration modes are analyzed. These vibration modes are generated by the passing of the magnetic poles inside the stator. The placement and size of stator slots are optimized based on the analysis. As a result, some of the stator slot openings are cut wider, others are cut narrower. As a result of these changes, the torque pulsation of the motor is reduced (see below). Last, but not least, in the interest of NVH reduction, another conventional solution is to use distributed winding instead of concentrated winding.

A physical vibration will bother passengers less if the energy of the vibration is not concentrated in a single frequency. Spreading the same vibration energy to a broader spectrum and lowering its peak magnitude leads to a more pleasant NVH experience for the customer. This is what other conventional solutions aim to accomplish. Multiple design changes are implementable. First, the magnets are installed slightly differently at each rotor pole. Second, there are small slots cut in the rotor to further reduce the energy of pulsation. The third design change skews the rotor. Rotor and stator skew are frequently used to improve NVH, but they lead to a 5-9% reduction in motor torque and increased manufacturing cost. The same torque can be achieved only by a longer motor stack, which adds to weight and cost to the design. Nonetheless, in this article a stepwise skew of rotor laminates is presented. Fourth, small notches are cut into the outside of the rotor. This improves NVH performance without impacting torque delivery. As a net outcome of all of these measures, a 6 decibel (dB) vibration reduction is achieved at the most dominant motor winding order. There is a slight reduction of peak torque.

Accordingly, improved electric motor systems and methods of their assembly, manufacturing, or arrangement and operation are presented herein. Two particular design features are presented for solving the problem, which are referred to herein as stator magnetic pole pair staggering and rotor pole pair staggering. In some implementations, the combination of these two solutions can also be implemented. Referring now to FIG. 1A, an example synchronous PMM 100 is illustrated. The North (N) and South (S) poles of the magnetic field are indicated with letters "N" and "S," respectively. For simplicity, only four poles and four pairs of permanent magnets 112 (112a-1, 112a-2, 112b-1, etc.) are shown. Electric motors having other suitable even numbers of poles are equally applicable, such as six or eight poles. The torque delivered by this motor 100 is plagued by two types of magnetic cogging. One of them is a result of the magnetic poles of the rotor 104 passing under the ferromagnetic teeth 120 of the stator 108. For illustration, three of these teeth 120 are shown in FIG. 1B.

The other source of magnetic cogging is the periodic strength of the magnetic field caused by the periodic layout of the inductors or electromagnetic coils 116 (116a, 116b, etc.) and the stator teeth 120. The coils 116 indicated with hatched circles close to rotor pole pairs "1" and "2" are controlled by a single set of switching transistors (not shown). Their controls are tied together by the circuit hardware design. The first type of magnetic cogging exists even with the stator current turned off. The second type of magnetic cogging only exists when the stator current is turned on. The pitch angle of the periodic layout of stator coils 116 and teeth 120 will be referred to herein as a (shown in FIG. 1B). The rotor magnets 112 create a magnetic field that reaches across to the stator 108 at an angle that is an integer multiple of a. The geometric and magnetic features of the stator 108 and rotor 104 have the same angular periodicity, and this creates the two forms of magnetic cogging. The systems/methods of the present invention mitigate or eliminate this magnetic cogging without the various downsides as described above.

Figure 2:
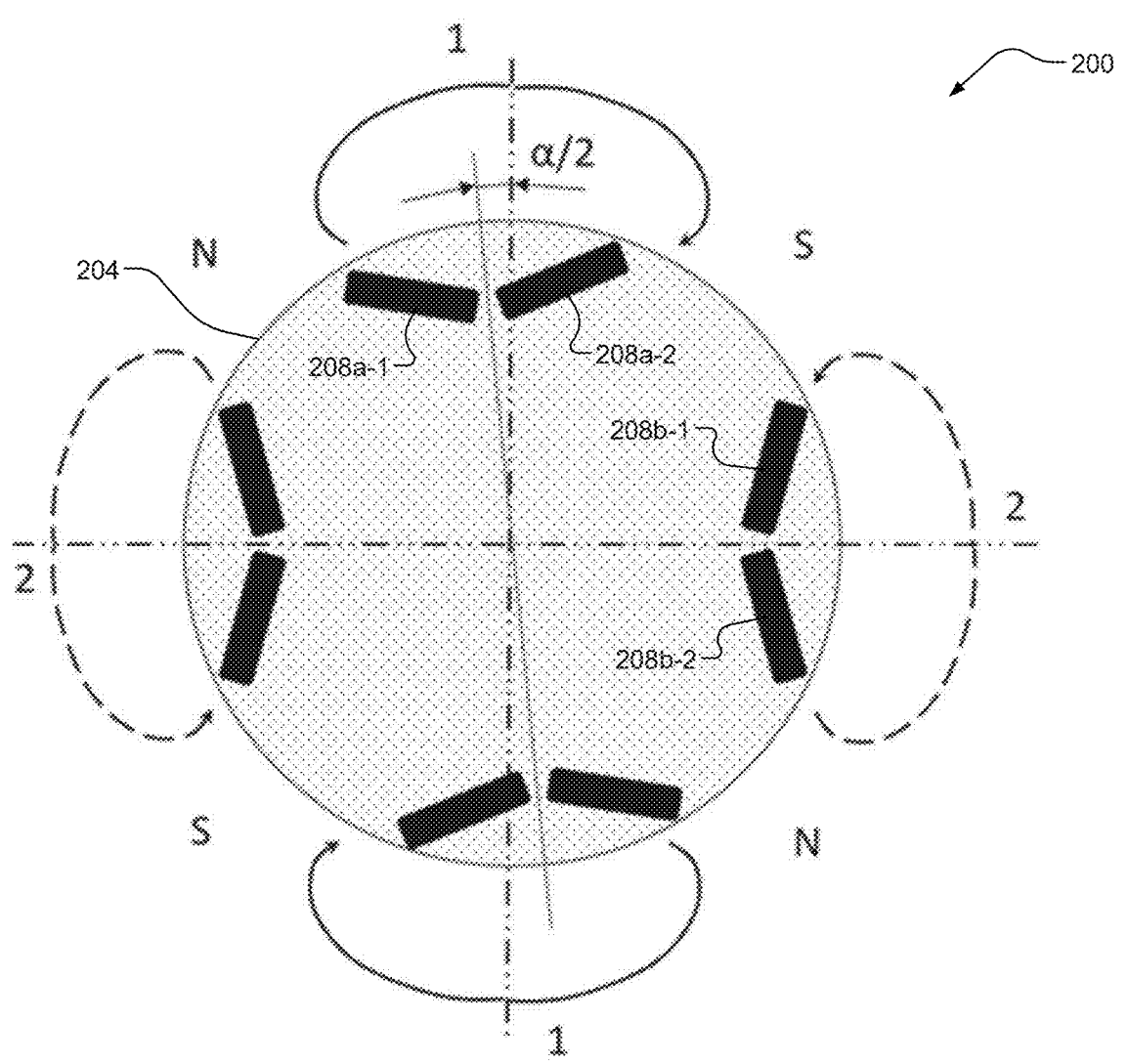
FIG. 2 is a cross-sectional diagram of an example four-pole PMM having an example rotor with opposing pairs of permanent magnets that are staggered or offset relative to the symmetric four-pole configuration of FIG. 1A by a same amount (symmetrical staggering) according to the principles of the present application.

Referring now to FIG. 2, the idea behind rotor pole pair staggering is that if fewer of the motor components are aligned with the same pattern of angular periodicity, then the cogging torque caused by the alignment will decrease. This consideration leads to creating a motor rotor in which some of the poles do not pass under the coils of the stator with the same angular periodicity. FIG. 2 shows rotor 204 of a motor 200 modified according to a first aspect of the application and having four pairs of permanent magnets 208a-1, 208a-2, 208b-1, 208b-2, etc. One of the rotor pole pairs 1, 2 is shifted by half a pitch of the stator. In practice, this is around 1-5 degrees. Also, the actual angle of shift must be optimized experimentally, especially in motors that spin in one direction for the most part of their service. Electric vehicle traction motors fall in this category. A lead or lag angle that works great with the motor spinning in one direction may not be the best in the other. Also, a design that is equally good both in forward and reverse directions may not be the best with the vehicle going forward. The optimization may consider vehicle movement in forward direction with much greater weight than in reverse.

As FIG. 2 shows, in this design, two opposing magnetic poles are shifted together, turned with the same angle, in the same direction around the axis of rotation. The stator magnetic field is the same as that of the unshifted, normal motor design. Pole pairs "1" and "2" are controlled by a single set of switching transistors. Their controls are tied together by the circuit hardware design. This solution may compromise efficiency. Experiments will quantify this anticipated reduction in efficiency. Also, because this motor works based on a permanent hardware structure, efficiency will be somewhat reduced under all operating modes of the motor 200. Nonetheless, this arrangement is expected to reduce both types of motor torque cogging. FIG. 2 shows $\alpha/2$ as the angle of stagger of one of the pole pairs. The value $\alpha/2$ is only an example, other values may work equally well or even better. The optimal angle will have to be determined experimentally. Also, it may be beneficial to optimize the angle based on the typical direction of rotation of the motor; in case of an electric vehicle, this would be the rotation direction that corresponds to the forward movement of the vehicle.

Figure 3A:
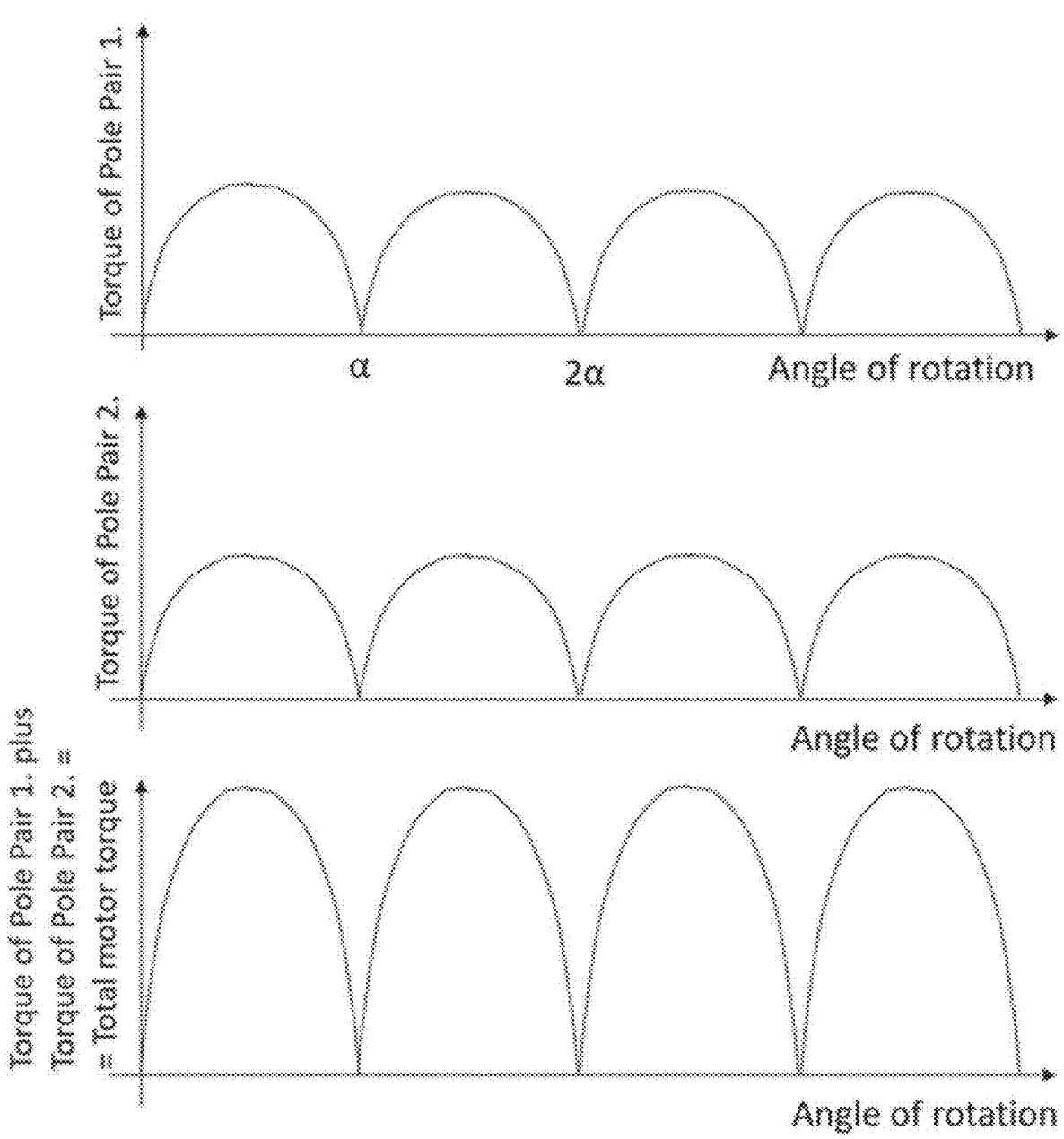
FIGS. 3A and 3B are example plots of torque signals of a four-pole PMM having the symmetric four-pole configuration of FIG. 1A and of a four-pole PMM having the example staggered or offset opposing magnetic pole pairs of FIG. 2, respectively, according to the principles of the present application.
Figure 3B:
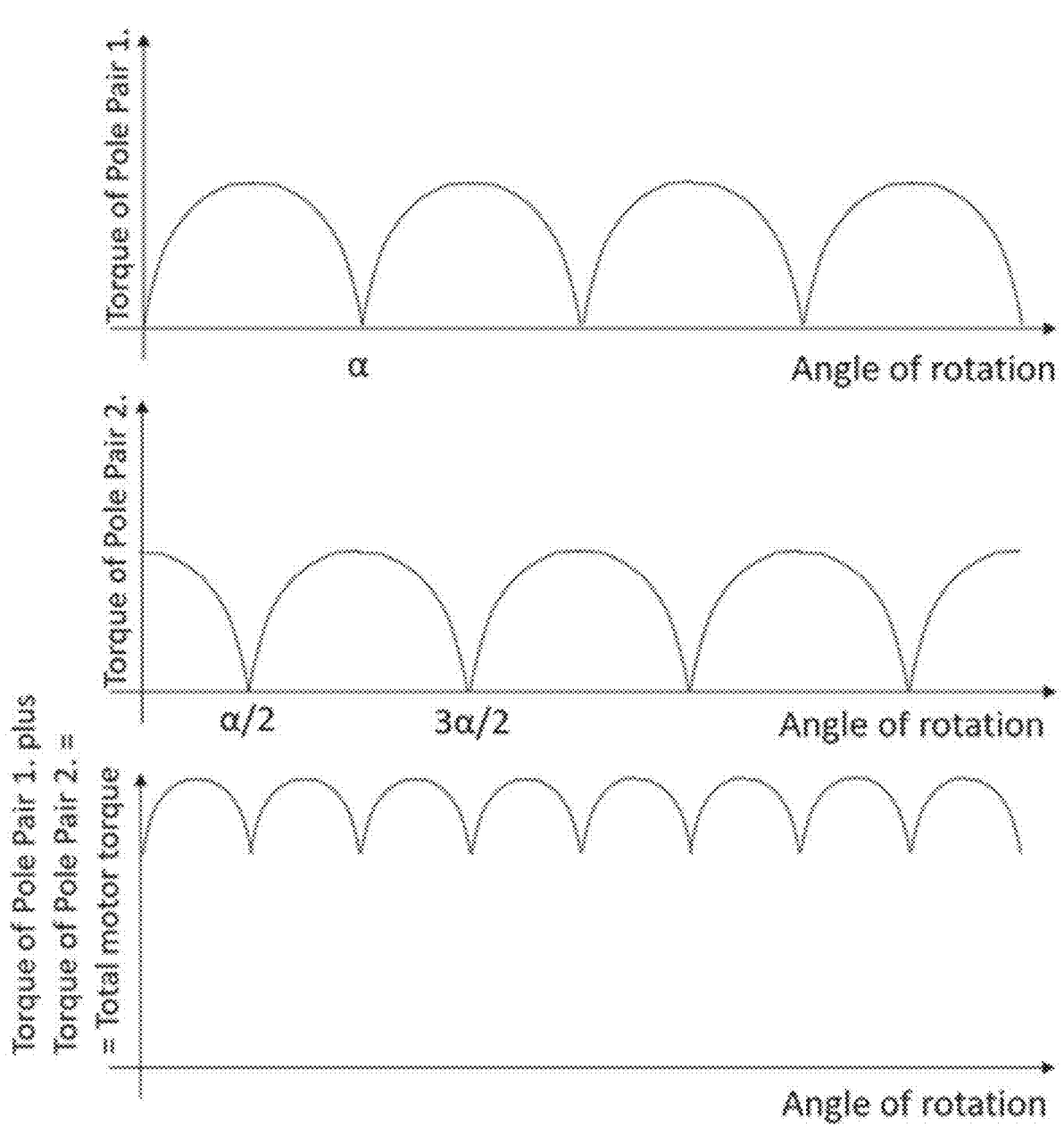

FIGS. 3A-3B show the torque signals of the two hypothetical pole pairs as a function of the angle of rotation in case of rotors with the equally pitched and the staggered pole pairs, respectively. The hilltops and valleys of these plots make each other's effects worse in case of the equally pitched rotor, adding up to a total motor torque signal with higher ripples case, the hilltops and valleys help cancel each other's effects, leading to a more stable total torque signal with smaller ripples that are shifted to twice the frequency.

Figure 4:
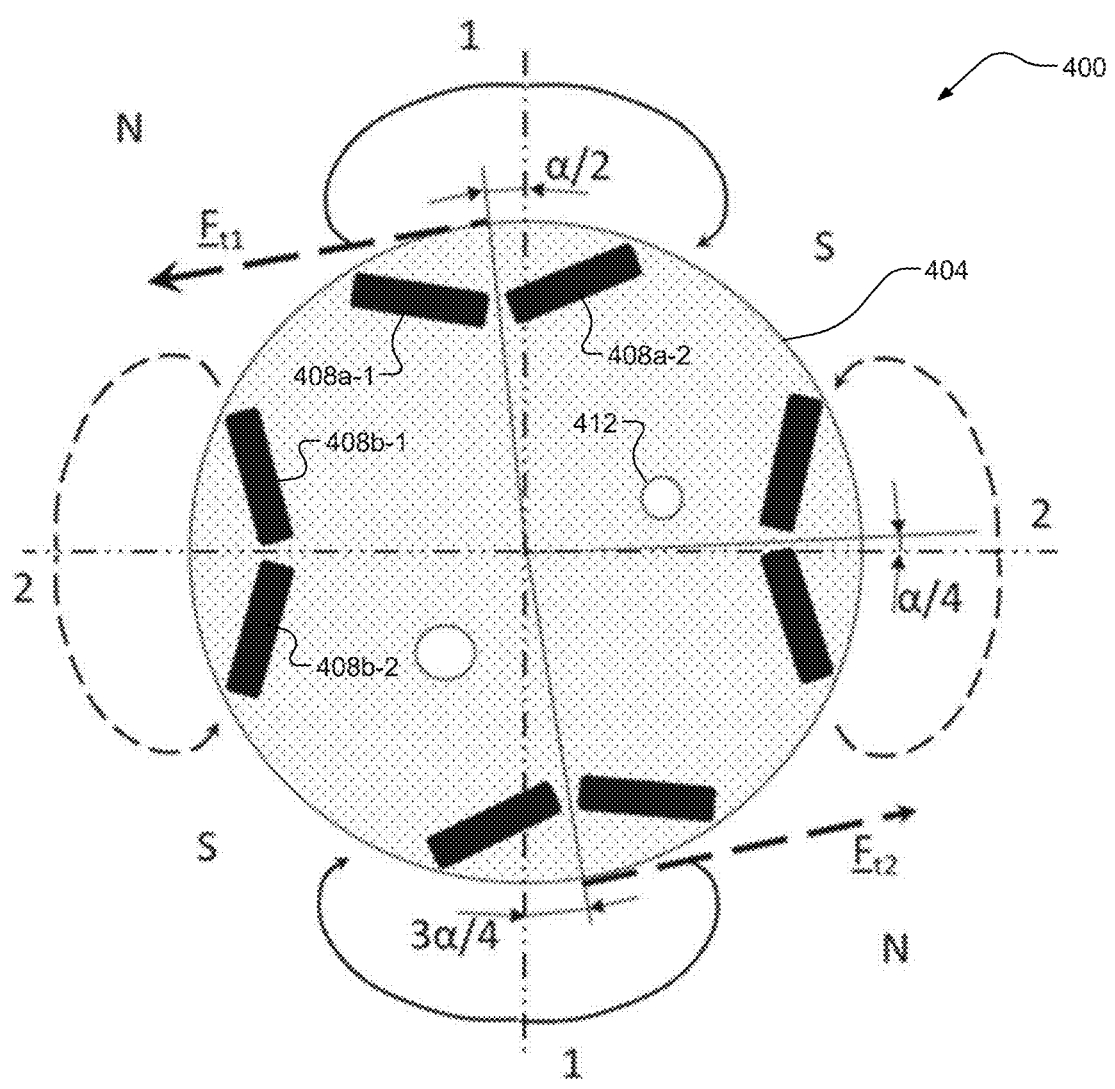
FIG. 4 is a cross-sectional diagram of an example four-pole PMM having an example rotor with opposing pairs of permanent magnets that are staggered or offset relative to the symmetric four-pole configuration of FIG. 1A by different amounts (asymmetrical staggering) according to the principles of the present application.

In some implementations, asymmetric staggering of rotor poles could be utilized. For instance, in FIG. 4, the four poles of the motor 400 are shifted at different angles, α/4 apart from each other. The magnetic cogging effects are expected to be canceled even better. The mass distribution of the magnets 408a-1, 408a-2, 408b-1, 408b-2, etc., and their cavities may not be centered on the axis of rotation anymore. This may be possible to compensate for by drilling holes 412 into the rotor. These are indicated with white circles for illustration. The magnetic forces are acting on the magnets of the two poles that are shifted α/2 and 3α/4 degrees apart. As shown in FIG. 4, if the diametrically opposing poles are shifted at different angles, then the tangential forces acting on them will no longer be equal and opposite. A resultant force (R) will be formed, and this force will act on the rotor 404 in radial direction. The force R will create an effect similar to that of an out-of-balance rotor, shaking the electromotor and the vehicle, causing NVH problems and wearing out bearings prematurely.

Figure 5:
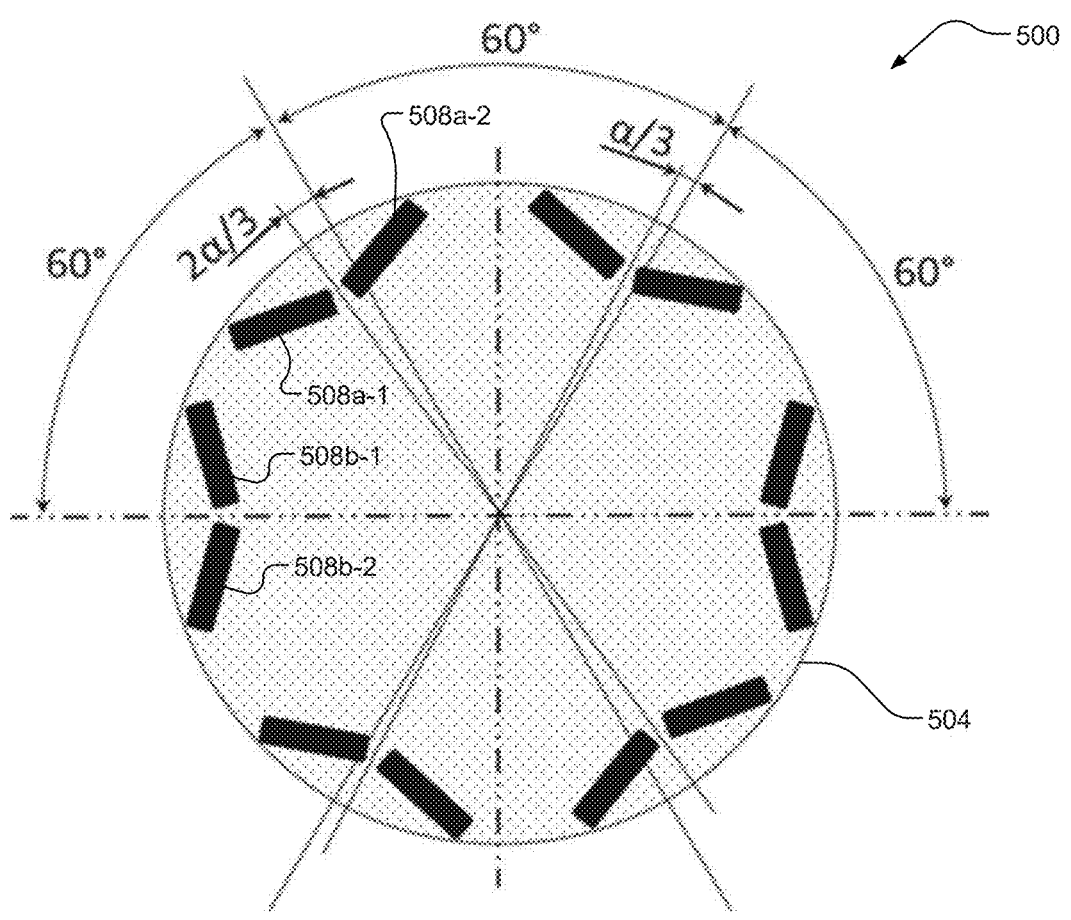
FIG. 5 is a cross-sectional diagram of an example six-pole PMM having an example rotor with two neighboring pairs of permanent magnets that are staggered or offset relative to a symmetric six-pole configuration by different amounts (asymmetrical staggering) according to the principles of the present application.

To make sure that the electromagnetic forces acting on the magnets add up to zero radial force, the magnetic poles opposing each other will have to be staggered at equal angles in equal direction. The design shown in FIG. 5 is based on this principle. In FIG. 5, a PMM 500 with a six-pole rotor 504 having pairs of permanent magnets 508a-1, 508a-2, 508b-1, 508b-2, etc., with one of the pole pairs staggered with an angle of α/3, and another pole pair with 2α/3 is shown. The values α/3 and 2α/3 are only examples, other values may work better. The optimal angle will have to be determined experimentally. Also, it may be beneficial to optimize the angle based on the typical direction of rotation of the motor; in case of an electric vehicle, this would be the rotation direction that corresponds to the forward movement of the vehicle. Based on the same logic, an eight-pole motor would have three of its four pole pairs staggered in steps of: α/4, 2α/4, 3α/4. As earlier, integer multiples of α/4 only serve as examples and starting values for experimental optimization. As in case of the four-pole design, it is to be noted that a rotor hardware that creates phase shifts between the pole pairs under all operating conditions of the motor will likely lead to some loss of efficiency under all operating conditions.

Figure 6:
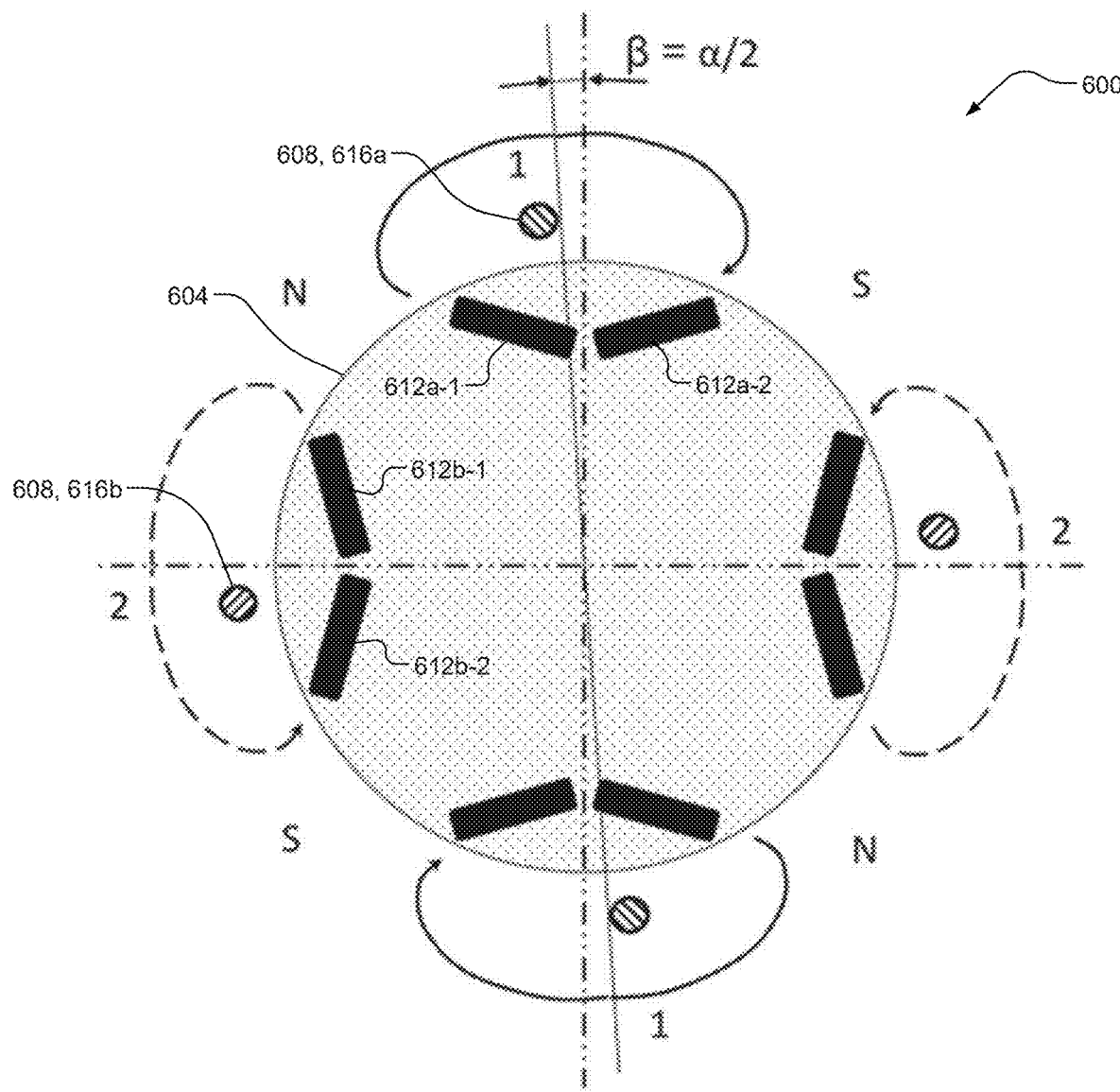
FIG. 6 is a cross-sectional diagram of an example four-pole PMM having an example rotor with symmetrically arranged permanent magnet pairs and a portion of an example stator illustrating an offset stator magnetic field angle for opposing windings of the stator according to the principles of the present application.
Figure 7:
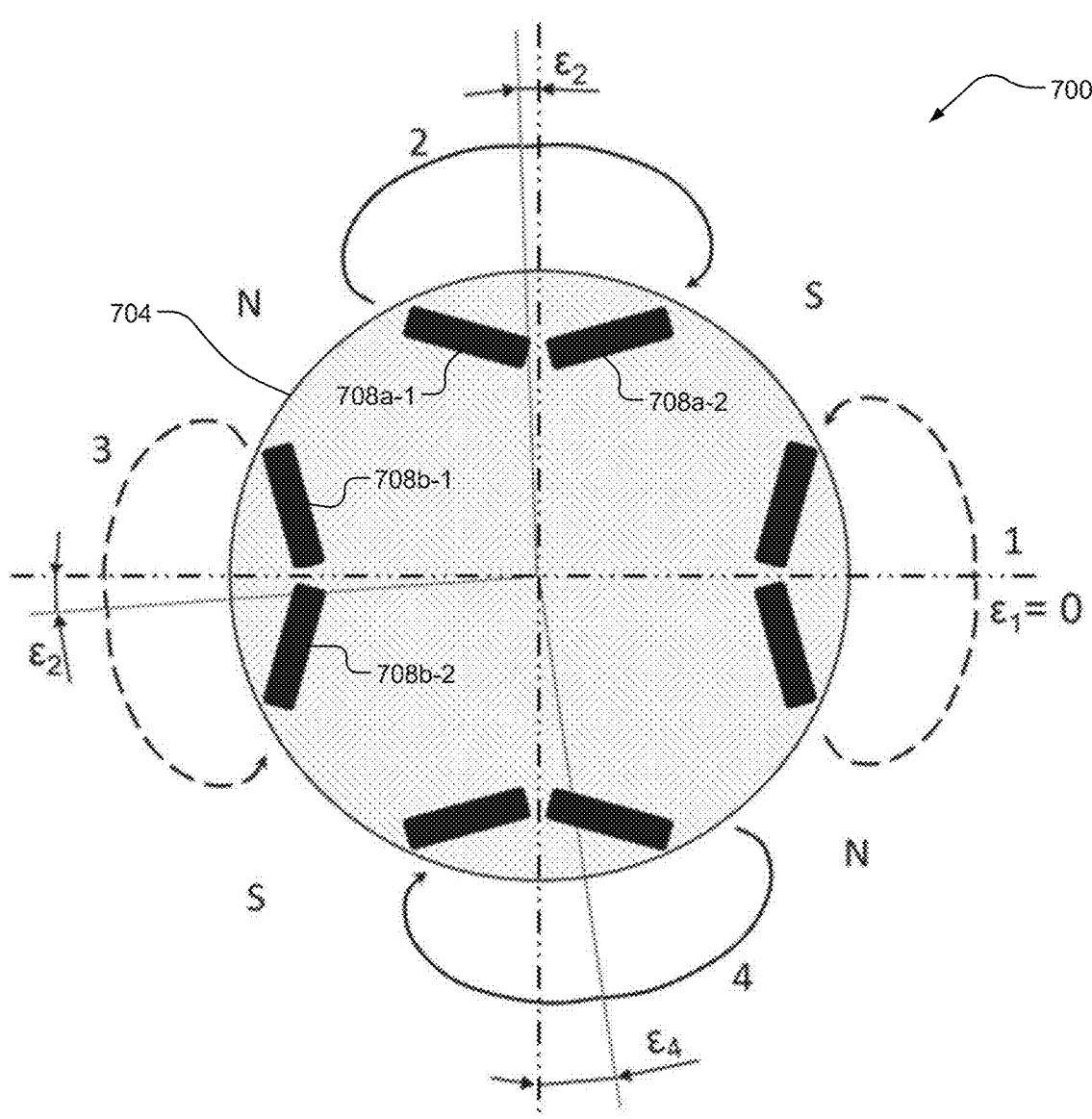
FIG. 7 is a cross-sectional diagram of an example four-pole PMM having an example rotor with symmetrically arranged permanent magnet pairs and a portion of an example stator illustrating multiple different stator magnetic field angles (individually staggered stator magnetic fields) according to the principles of the present application.

In another aspect of the present application, stator ignition phase staggering is utilized and illustrated in the PMMS 600, 700 of FIGS. 6-7. The periodic angular alignment of the geometric and magnetic features of the rotor 604 and the stator 608 can be disrupted in the domain of electromagnetic field control as well. This feature rests on a key assumption: rotor angle measurements and/or estimates are available real-time for the motor control processor. In this design, the rotor magnet pairs may be equally pitched or, in other words, no magnets 612a-1, 612a-2, 612b-1, 612b-2, etc. may be staggered. It will be appreciated, however, that stator ignition phase staggering could be employed in conjunction with rotor pole staggering, which will be discussed in greater detail below. The stator coils 616a, 616b, etc. can be controlled to create a slight phase shift for two of the four poles of the rotating magnetic field. Now the stator magnets don't all see the same magnetic bumps at the same time. This invention may also compromise efficiency.

In different operating conditions (torque, shaft speed, direction) of the motor the stator can be controlled to provide different phase shifts. In some cases, the phase shift can be optimized for efficiency. In other cases, the phase shift can be optimized to reduce torque-pulsation. In-between, blended scenarios are also possible. The coils at pole pairs "1" and "2" are controlled by two sets of switching transistors. Their controls are independent of each other based on the circuit hardware design. This solution requires twice as many switching transistors, but each switching transistor will carry half the current compared to the original, symmetrical field design. The overall cost and the heat produced may be similar to those of the design with equally pitched stator field activation. Stator ignition phase staggering can be turned off and on to different levels, as needed, as a function of motor operating conditions, such as temperature, shaft-speed and torque. With this solution, efficiency may be lower, but motor torque pulsation and resonances will also be reduced. Most importantly, the processor can be programmed to stagger the stator ignition phase selectively, only when the motor passes an operating zone that would lead to resonance without ignition phase staggering.

FIG. 6 shows an example for stator ignition phase staggering. The stator pole pair field "1" is staggered by an angle β. The angle β=α/2 is not intended to represent a departure from generality. It is indicated only as an example and as a good starting value for experimental optimization. Whether the angle β represents a phase lead or a phase lag, depends on the direction of rotation. While it may be possible to individually stagger each of the four stator fields at phase angles ε1, ε2, ε3, and ε4, as shown in FIG. 7, this could potentially throw the tangential forces acting on the rotor 704 off-balance, and create a resultant force that acts in radial direction, analogously to the design with asymmetrically staggered rotor magnetic poles shown in FIG. 4. That said, the design of individually staggered state field angles could also provide for other beneficial results, such as improved torque performance or improvement of some other operating parameter or key design metric.

Figure 8:
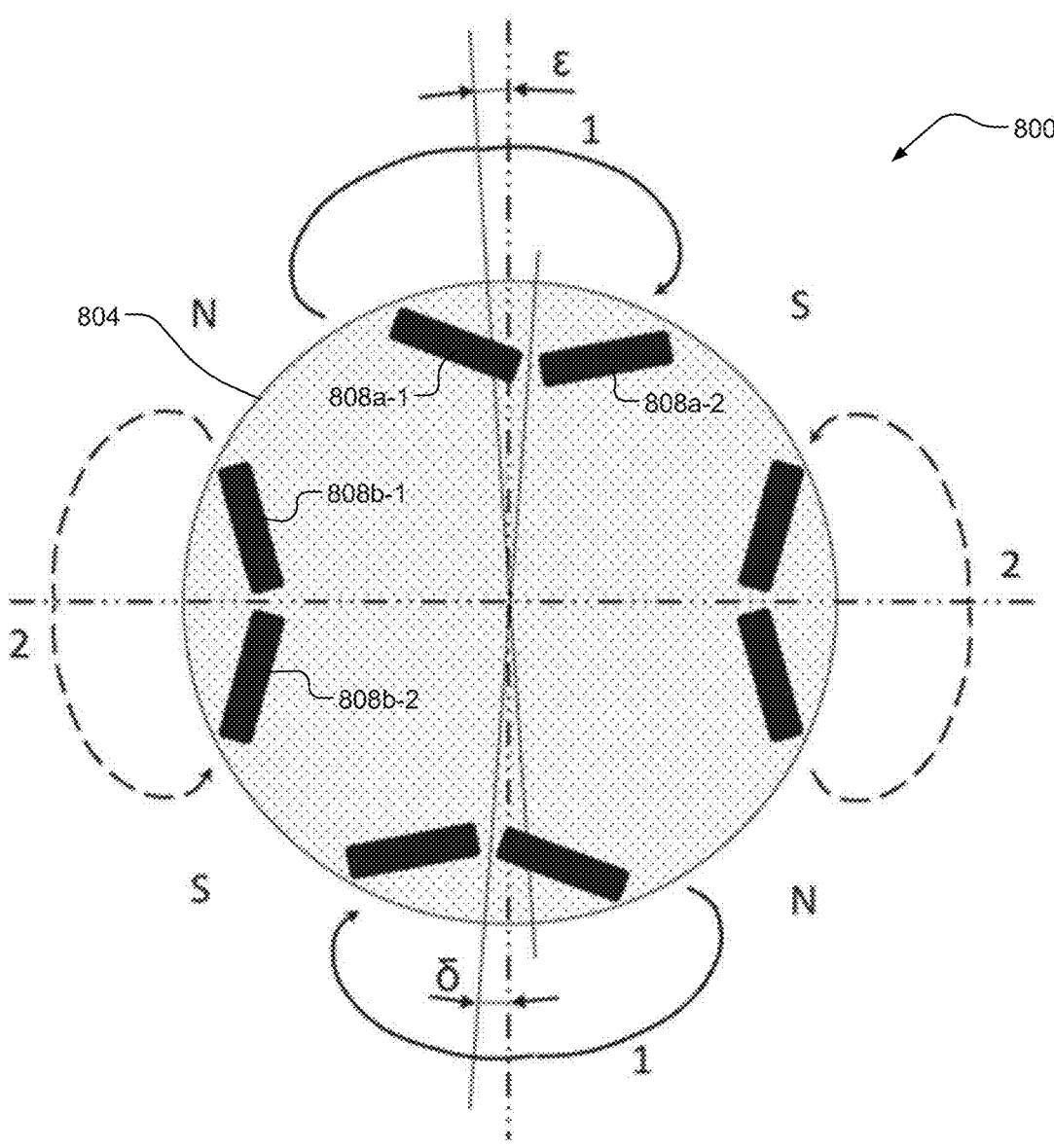
FIG. 8 is a cross-sectional diagram of an example four-pole PMM having both an example rotor with asymmetrically staggered permanent magnet pairs and a portion of an example stator having staggered stator magnetic field angles according to the principles of the present application.

As illustrated in FIG. 8, in the case of the combined approach as previously mentioned herein, rotor pole pair "1" is shifted by an angle δ, while the stator field pair "1" is shifted by an angle "ε." The illustrated PMM 800 includes a rotor 804 with pairs of permanent magnets 808a-1, 808a-2, 808b-1, 808b-2, etc. and a stator (not shown) with coils (not shown). Again, for stator ignition phase staggering, this combined approach also rests on a key assumption: rotor angle measurement and/or estimate is available real-time for the motor control processor. In the case of the combined approach, the processor (i.e., controller or control system for the PMM, described in greater detail below) should have the ability to deduct which rotor pole pair is closely lined up with each stator field pair. In different operating conditions (torque, shaft speed, direction) of the motor, the stator can be controlled to provide different phase shifts. In some operational modes, the phase shift can be optimized for efficiency. In other operational modes, the phase shift can be optimized to reduce torque-pulsation. In-between, blended scenarios are also possible. Pole pairs "1" and "2" are controlled by two sets of switching transistors (not shown). Their controls are independent of each other based on the circuit hardware design. This solution again requires twice as many switching transistors, but each switching transistor will carry half the current compared to the original, symmetrical field design.

Figure 9:
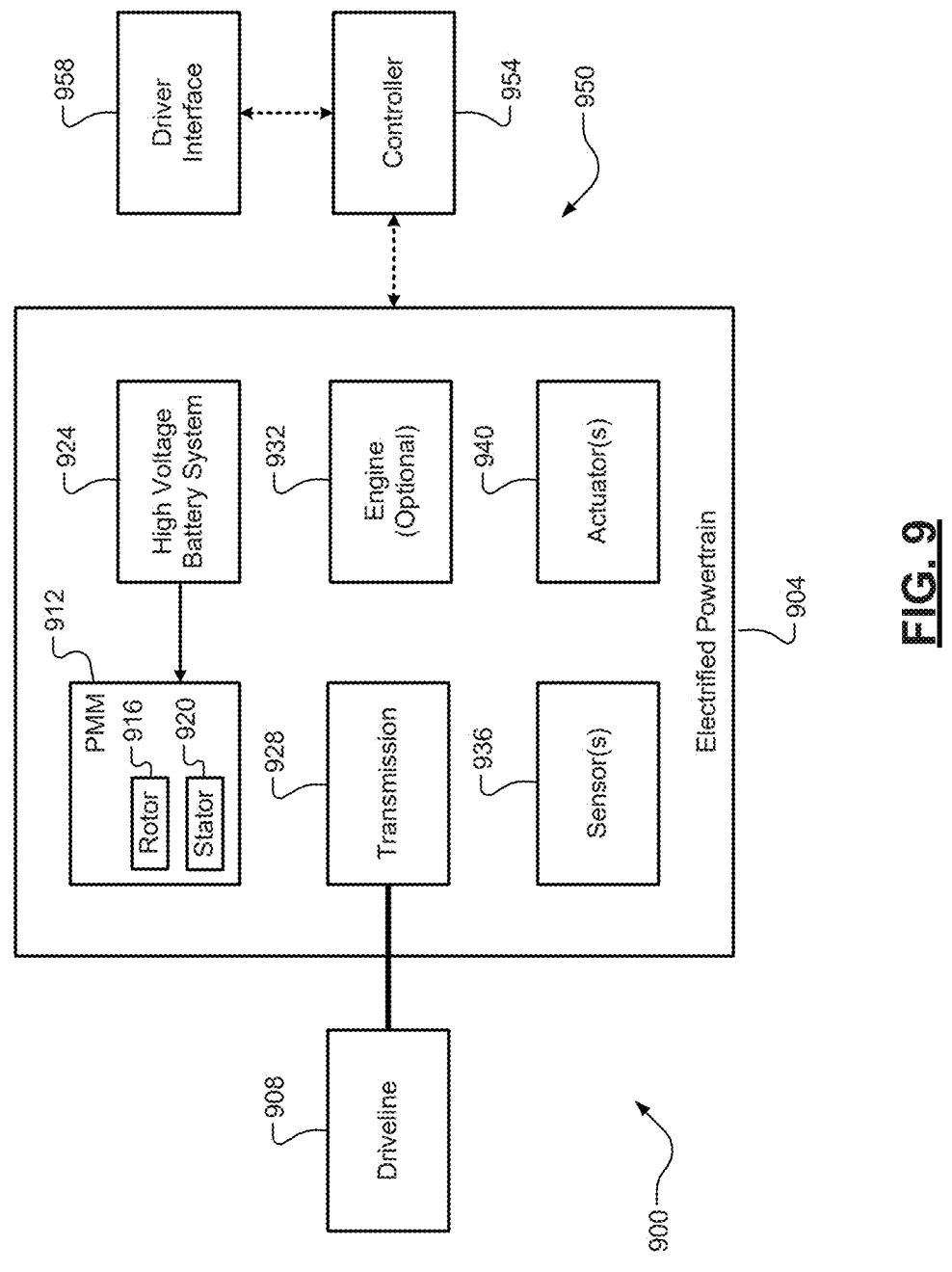
FIG. 9 is a functional block diagram of a vehicle having an example PMM system according to the principles of the present application.

Referring now to FIG. 9, a functional block diagram of an example electrified vehicle 900 having an electrified powertrain 904 with a PMM 912 according to some implementations of the present application is illustrated. The electrified powertrain 904 is configured to generate torque, at least some of which is transferrable to a driveline 908 for propulsion of the electrified vehicle 900. The PMM 912 includes a rotor 916 and a stator 920 and has the design according to one of the previously described solutions of the present invention. The PMM 912 is powered by current provided by a high voltage battery system 924 (lithium ion, lithium iron phosphate, etc.). A transmission 928 transfers the torque from the electrified powertrain 904 to the driveline 908. An optional internal combustion engine 932 could be provided as part of the electrified powertrain 904 and configured to combust an air and fuel (gasoline, diesel, etc.) mixture to generate torque. This torque could be used for vehicle propulsion via the transmission 928 and/or for other suitable uses, such as recharging the high voltage battery system 924. The electrified powertrain 904 also likely includes one or more sensors 936 and one or more actuators 940 for sensing various operating parameters (speeds, torques, temperatures, etc.) and for controlling various subsystems, respectively. Reference 950 generally refers to the PMM 912 and a controller 954, also referred to herein as an "electric motor system." The controller 954 controls operation of the electrified powertrain 904, such as to generate an amount of drive torque to satisfy a torque request provided by a driver of the electrified vehicle 900 via a driver interface 958 (e.g., an accelerator pedal).

While not specifically illustrated, it will be appreciated that the present application also comprises methods of arranging and operating an electric motor system for an electrified vehicle, the electric motor system including a permanent magnet motor (PMM) and a controller. In one aspect, a first method includes providing the PMM including (I) forming a hollow cylindrical stator defining a circular inner portion with a plurality of slots each having rectangular or similar shapes (oval, U-shaped, etc.), defined between a respective plurality of ferromagnetic teeth, and having a plurality of electromagnetic coils arranged in the plurality of slots, respectively and (ii) forming a cylindrical rotor disposed within the stator and defining a circular outer portion having N pairs of permanent magnets each having rectangular or substantially-rectangular shapes and arranged thereabout to define N rotor poles, respectively, wherein at least one pair of the N pairs of permanent magnets is asymmetrically staggered or offset relative a symmetric N pole positioning, and wherein N is an even integer greater than or equal to four (four, six, eight, etc.), and finally (iii) providing a controller configured to control the PMM to mitigate or eliminate magnetic cogging.

In another aspect, second and third methods include additionally or alternatively (i) providing the PMM with a stator configured such that, for each magnetic pole of the N magnetic poles of the rotor, the stator has one or more corresponding pairs of electromagnetic coils of the plurality of electromagnetic coils that are each pitched relative to the rotor magnetic pole, and (ii) the controller being configured to control each pair of electromagnetic coils to stagger or offset a stator magnetic field generated by the pair of electromagnetic coils relative to the rotor magnetic poles, and wherein the controller utilizes twice as many switching transistors to individually control each electromagnetic coil of each pair of electromagnetic coils to receive a different current magnitude.

It will be appreciated that the term "controller" as used herein refers to any suitable control device or set of multiple control devices that is/are configured to perform at least a portion of the techniques of the present application. Nonlimiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. An electric motor system for an electrified vehicle, the electric motor system comprising:
   a permanent magnet motor (PMM) including:
      a hollow cylindrical stator defining a circular inner portion with a plurality of slots, defined between a respective plurality of ferromagnetic teeth, and having a plurality of electromagnetic coils arranged in the plurality of slots, respectively; and
      a cylindrical rotor disposed within the stator and defining a circular outer portion having N pairs of permanent magnets arranged thereabout to define N rotor poles, respectively, wherein N is an even integer greater than or equal to four; and
   a controller configured to control the PMM to mitigate or eliminate magnetic cogging by controlling each pair of electromagnetic coils to stagger or offset a stator magnetic field generated by the pair of electromagnetic coils relative to the rotor magnetic poles, wherein the controller utilizes N/2 times as many switching transistors to individually control each electromagnetic coil of each pair of electromagnetic coils to receive a different current magnitude,
   wherein the magnetic cogging is caused by a periodic strength of a magnetic field resulting from a periodic layout of the electromagnetic coils and the ferromagnetic stator teeth, and wherein the controller is configured to control the PMM to mitigate or eliminate magnetic cogging when the electromagnetic coils are energized.

2. The electric motor system of claim 1, wherein the magnetic cogging is caused by the rotor poles passing under the ferromagnetic stator teeth and is mitigated or eliminated due to the staggering or offsetting of the stator magnetic field relative to the rotor magnetic poles.

3. The electric motor system of claim 1, wherein at least some of the N pairs of permanent magnets of the rotor are arranged to have a symmetric N pole positioning, and wherein the symmetric N pole positioning is every 360/N degrees.

4. The electric motor system of claim 3, wherein at least one pair of the N pairs of permanent magnets is asymmetrically staggered or offset relative to the symmetric N pole positioning.

5. The electric motor system of claim 4, wherein the magnetic cogging is caused by the rotor poles passing under the ferromagnetic stator teeth and is mitigated or eliminated due to the asymmetric staggering or offsetting of the at least one pair of the N pairs of permanent magnets.

6. The electric motor system of claim 4, wherein at least two pairs of the N pairs of permanent magnets are asymmetrically staggered or offset relative to the symmetric N pole positioning.

7. The electric motor system of claim 6, wherein the at least two asymmetrically staggered or offset pairs of the N pairs of permanent magnets include circularly opposed pairs.

8. The electric motor system of claim 7, wherein the circularly opposed pairs are asymmetrically staggered or offset by a same amount relative to the symmetric N pole positioning.

9. The electric motor system of claim 6, wherein the at least two asymmetrically staggered or offset pairs of the N pairs of permanent magnets are asymmetrically staggered or offset by different amounts relative to the symmetric N pole positioning.

10. A method of arranging and operating an electric motor system for an electrified vehicle, the electric motor system including a permanent magnet motor (PMM) and a controller, the method comprising:

providing the PMM including:
      forming a hollow cylindrical stator defining a circular inner portion with a plurality of slots, defined between a respective plurality of ferromagnetic teeth, and having a plurality of electromagnetic coils arranged in the plurality of slots, respectively; and
      forming a cylindrical rotor disposed within the stator and defining a circular outer portion having N pairs of permanent magnets arranged thereabout to define N rotor poles, respectively, wherein N is an even integer greater than or equal to four; and
   providing a controller configured to control the PMM to mitigate or eliminate magnetic cogging by controlling each pair of electromagnetic coils to stagger or offset a stator magnetic field generated by the pair of electromagnetic coils relative to the rotor magnetic poles, wherein the controller utilizes N/2 times as many switching transistors to individually control each electromagnetic coil of each pair of electromagnetic coils to receive a different current magnitude, wherein the magnetic cogging is caused by a periodic strength of a magnetic field resulting from a periodic layout of the electromagnetic coils and the ferromagnetic stator teeth, and wherein the controller is configured to control the PMM to mitigate or eliminate the magnetic cogging when the electromagnetic coils are energized.

11. The method of claim 10, wherein the magnetic cogging is caused by the rotor poles passing under the ferromagnetic stator teeth and is mitigated or eliminated due to the staggering or offsetting of the stator magnetic field relative to the rotor magnetic poles.

12. The method of claim 10, wherein at least some of the N pairs of permanent magnets of the rotor are arranged to have a symmetric N pole positioning, and wherein the symmetric N pole positioning is every 360/N degrees.

13. The method of claim 12, wherein at least one pair of the N pairs of permanent magnets is asymmetrically staggered or offset relative to the symmetric N pole positioning.

14. The method of claim 13, wherein the magnetic cogging is caused by the rotor poles passing under the ferromagnetic stator teeth and is mitigated or eliminated due to the asymmetric staggering or offsetting of the at least one pair of the N pairs of permanent magnets.

15. The method of claim 13, wherein at least two pairs of the N pairs of permanent magnets are asymmetrically staggered or offset relative to the symmetric N pole positioning.

16. The method of claim 15, wherein the at least two asymmetrically staggered or offset pairs of the N pairs of permanent magnets include circularly opposed pairs.

17. The method of claim 16, wherein the circularly opposed pairs are asymmetrically staggered or offset by a same amount relative to the symmetric N pole positioning.

18. The method of claim 15, wherein the at least two asymmetrically staggered or offset pairs of the N pairs of permanent magnets are asymmetrically staggered or offset by different amounts relative to the symmetric N pole positioning.

* * * * *